No. 654,162. Patented July 24, 1900.
F. L. KUHN.
FRICTION CLUTCH.
(Application filed Nov. 7, 1899.)
(No Model.)

Witnesses
Frederick L. Kuhn, Inventor
By his Attorneys,

THE NORRIS PETERS CO., PHOTO-LITHO., WASHINGTON, D. C.

UNITED STATES PATENT OFFICE.

FREDERICK LEWIS KUHN, OF FITCHBURG, MASSACHUSETTS.

FRICTION-CLUTCH.

SPECIFICATION forming part of Letters Patent No. 654,162, dated July 24, 1900.

Application filed November 7, 1899. Serial No. 736,159. (No model.)

*To all whom it may concern:*

Be it known that I, FREDERICK LEWIS KUHN, a citizen of the United States, residing at Fitchburg, in the county of Worcester and State of Massachusetts, have invented a new and useful Friction-Clutch, of which the following is a specification.

My invention relates to improvements in friction-clutches especially adapted for use in connection with loose pulleys, although it is capable of use in other relations.

One object of the invention is to positively move the loose driven clutch member in both directions for making the same fast with or idle relative to the driving clutch member.

A further object is to provide means for regulating the throw or movement of the actuating-levers, so as to vary the adjustment of the driven clutch member for the purpose of compensating for wear on the elements and to insure the necessary tight frictional engagement.

A further object is to provide, in a high-speed clutch-pulley, means to counteract the centrifugal force of the levers which actuate to shift the driven clutch member.

With these ends in view the invention consists in the novel combination, construction, and arrangement of parts, which will be hereinafter fully described and claimed.

To enable others to understand the invention, I have illustrated the same in the accompanying drawings, forming a part of this specification, and in which—

Figure 1:
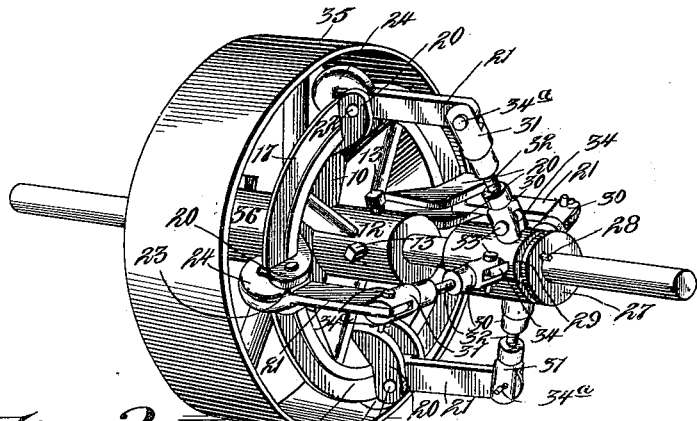
Figure 2:
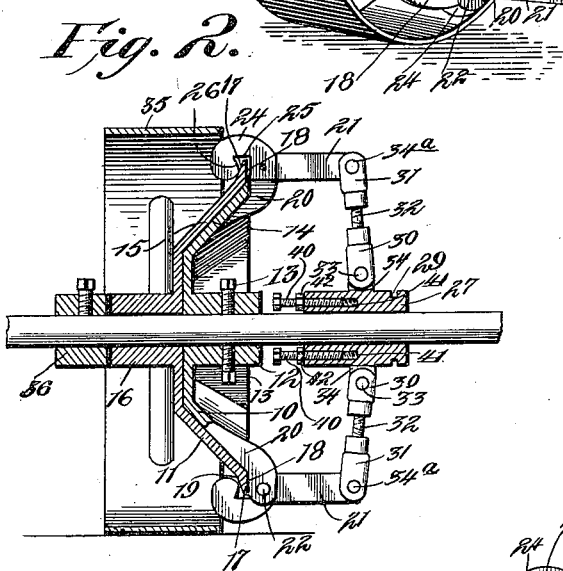
Figure 3:
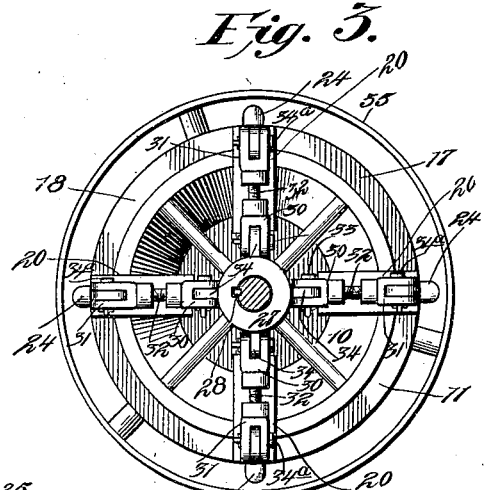
Figure 4:
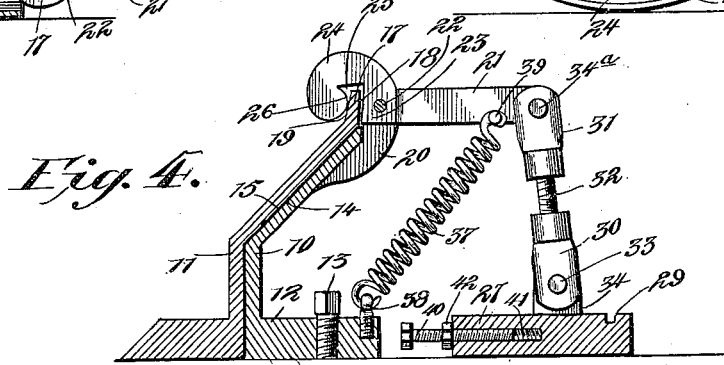

Figure 1 is a perspective view of a friction-clutch pulley constructed in accordance with this invention. Fig. 2 is a vertical sectional view taken centrally of Fig. 3. Fig. 3 is a side elevation with the shaft in cross-section looking toward the clutch-pulley from the right of Fig. 2. Fig. 4 is an enlarged detail sectional elevation illustrating a fragment of the driving and driven clutch members, one of the levers, a fragment of the means for adjusting the lever, and a spring which counteracts the centrifugal force of the lever, said spring being employed when the clutch is used in connection with a high-speed pulley.

The same numerals of reference are used to indicate like and corresponding parts in each of the several figures of the drawings.

The conical male and female members of the clutch are indicated by the reference-numerals 10 11, respectively, and these members are herein shown as mounted on one shaft in a manner to constitute the driving and the driven clutch members, respectively. Either member may constitute the driving member, which should be fast with the shaft, while the other member is the driven member, which when the two members are used on a common shaft should be idly or loosely mounted thereon. For the purpose of this specification I have shown the conical male member 10 as the driving clutch member, and to this end said member has a hub 12, which is fitted on the shaft in a manner for the binding-screws 13 to impinge against the shaft, so as to make the member 10 fast therewith. This driving clutch member is formed with a conical portion to produce a friction-surface 14, the angle of the cone and the friction-surface being approximately forty-five degrees (45°) to the axis of the shaft. The conical female member 11 has an angular portion corresponding to the cone of the male member to produce a friction-surface 15, the area of which is equal to that of the corresponding surface on the male member, whereby the two members are adapted to fit tightly together for the attainment of the necessary frictional contact between the engaging surfaces for the driven member to rotate with the driving member. The driven member 11 has a hub 16, which is shown by Fig. 2 as being mounted loosely on the shaft. The driven member is furthermore provided with a flange 17, the latter protruding beyond the conical female friction-surface of said member and lying radially to the axis of the shaft, as shown clearly by Figs. 2 and 4. This annular radial flange on the driven female member of the clutch has its surface 18, which faces the conical male member, in a plane at right angles to the axis of the shaft, thus presenting a square surface for the action of the shifting-levers; but the other surface 19 of this radial flange is inclined at an angle to the flat surface 18 and the axis of the shaft for a purpose which will hereinafter appear.

The driving male member of the clutch is provided with pairs of lugs 20, which are distributed around the periphery of said member substantially as shown by Figs. 1 and 3, each pair of lugs being integral with said member and projecting from the rear or neutral surface thereof, so as to extend beyond the peripheral edge of the member. A series of shipping or actuating levers are supported by these pairs of lugs on the driving clutch member, said levers being fulcrumed individually in the lugs and constructed to engage with opposite faces of the radial flange on the driven member 11. Each lever is constructed with an enlarged heel 23, which fits between the lug, so as to have an edge opposed to the squared face 18 on the flange 17 of the driven member, and said end of the lever is furthermore provided with an offset arm 24, the latter arranged to extend over the edge of the radial flange 17 and occupy a spaced relation to the edge of the heel 23, thus providing a space 25 between the edge of the heel and a curved binding edge 26 of the offset arm. The heel-formed end of each lever is fulcrumed on a pin or bolt 22, supported by the lugs 20, said pin or bolt passing through the lever-heel at a point to one side of the edge of said heel, so that the edge will be presented in proper position to bear against the squared face 18 on the radial flange of the radial clutch member. The offset arms of the series of levers 21 are arranged in corresponding positions on the lugs of the driving clutch member 10 for the radial flange of the driven clutch member to extend into the spaces 25 in a manner for the squared face of the flange to be presented opposite the heels of the levers, while the inclined face of the flange is opposite the curved binding edges 26 of the offset arms on the levers. In one position of the operating element associated with the clutch members this radial flange on the driven clutch member is clear of or free from engagement with the heels and offset arms of the levers. By exerting strain on the levers to move their free ends inward toward the shaft the heels of the levers press against the squared face of the flange in a manner to positively shift the female member away from the male member in order to disengage the clutch members. A reverse movement of the levers, however, in a direction to move the levers away from the shaft throws the binding-surfaces 26 of the offset arms into engagement with the inclined face of the radial flange, so that the driven clutch member is positively moved toward and into frictional engagement with the driving clutch member, thus connecting the two members fast one with the other. It is to be observed that the levers are arranged in spaced relation around the driving member, so as to engage at equidistant points with the flange of the driven member, thereby insuring accurate adjustment to the driven member and preventing the same from binding on the shaft. The peculiar formation of the flange on the driven clutch member and the offset arms on the actuating-levers insures the proper engagement of the parts with a minimum amount of friction between the surfaces and at the same time disposes the levers in positions to positively shift the driven clutch member in either direction.

27 designates a slidable collar which is preferably splined or keyed at 28 on the shaft at one side of the hub for the driving clutch member, and this collar has an annular groove 29, which loosely receives the forked end of a hand-lever, (not shown,) as is usual, for the manipulation of the clutch. The slidable collar is connected operatively with the free end of the shifting-levers 21 by a series of sectional links which are extensible in order to vary the positions of the levers relative to the clutch members, whereby the parts may be adjusted to compensate for wear and to secure the necessary frictional engagement between the clutch members by an adjustment of the sectional links. Each link consists of the members 30 31 and a screw 32, which screw is disposed in alinement with the members and has threaded engagement therewith for adjusting the members to increase or decrease the length of the link. The link member 30 is forked to embrace a lug 34 on the collar 27, said forked end of the link being pivoted at 33 to the lug. The other link member 31 is bifurcated to receive the free end of one lever 21, and said link member and the lever are pivoted together by a pin or bolt 34ª, all as clearly shown by the drawings. The contiguous ends of the link members are provided with right and left screw-threaded sockets, respectively, and the screw 32 has right and left hand threads which screw into the sockets of the link members, whereby an adjustment of the screw in one direction shortens the length of the link, while adjustment in the opposite direction increases the length of the link. The sectional links have their members normally in fixed relations by coupling them through the agency of the screws, and said links are disposed substantially in radial positions between the slidable collar and the levers. It is evident that a movement of the collar in either direction actuates the links to shift the positions of the levers; but the screws of the links may be turned slightly in order to vary the relative positions of the levers to the flanged clutch member, thus giving an adjustment of the levers independently of the movement imparted thereto by the collar.

In Figs. 1 to 3, inclusive, I have represented the clutch in active relation to a pulley 35, mounted on the shaft and confined against slidable movement thereon by a stop-collar 36, and in this embodiment of the invention the conical female driven member 11 is made fast with the pulley by constructing said clutch member integral with the pulley-hub or attaching the same thereto by any approved means which will readily suggest themselves to the skilled constructor.

The use of the improved friction-clutch in connection with a high-speed pulley or other mechanical element will have a tendency to make the levers 21 fly or move in an outward direction under centrifugal force, whereby the levers will serve to draw the member 11 too tightly into engagement with the member 10. To overcome the centrifugal force of the levers when the clutch is used on a high-speed pulley, I employ the counterpoise-springs 37 in connection with the series of levers, one of said springs being shown by Fig. 4. The spring 37 has one end secured to a bolt 38, which is made fast with the hub of the driving clutch member 10, while the other end of the spring is fastened to the lever by a pin 39. The tension of the spring is such that it has no appreciable effect on the lever when the same is adjusted by the slidable collar and the links; but any tendency of the levers to fly outward under centrifugal force causes the springs to become distended and counteract the undue outward movement of the levers.

Changes may be made in the form and proportion of some of the parts while their essential features are retained and the spirit of the invention embodied. Hence I do not desire to be limited to the precise form of all the parts as shown, reserving the right to vary therefrom.

The slidable collar is provided with means for limiting its travel relatively to the clutch member 10, so that it cannot be moved by hand too far and throw the links out of a proper working position. It should be explained that the links stand in a position either at right angles to the collar or in a position slightly inclined toward the clutch member, as shown by Figs. 2 and 4. The collar-arresting devices are in the form of screws 40, one or more in number, fitted in threaded openings 41 of the collar, so as to be adjustable therein toward or from the hub 12 of the clutch member. Said screws have check-nuts 42 to prevent them from turning accidentally out of place.

Having thus described the invention, what I claim is—

1. In a friction-clutch, the combination of driving and driven members, one having a flange extended beyond the engaging faces of said members, levers in operative relation to both faces of the flange on one clutch member and adapted to positively engage both faces and move said flanged member in either direction, and means for actuating said levers, substantially as described.

2. In a friction-clutch, the combination of driving and driven members, one having a flange protruding beyond the friction-faces of said members, a series of levers hung on one member and each provided with an offset arm which spans the flange on the other member, and means for adjusting said levers to positively engage said flange alternately on opposite sides and move the flanged member in either direction, substantially as described.

3. In a friction-clutch, the combination of a conical male member, a conical female member provided with a flange which projects beyond the friction-surfaces of said members, levers fulcrumed on the male member for the heels thereof to engage with one face of the flange and provided with offset arms adapted to bind against the other face of the flange, and means for shifting the positions of said levers, for the purpose described, substantially as set forth.

4. In a friction-clutch, the combination of a conical male member, a conical female member provided with a radial flange protruding beyond the friction-surfaces of said members, levers fulcrumed on the male member for their heels to engage with one face of the flange and having offset arms which are presented to the other face of the flange, a slidable collar, and sectional links operatively connecting the collar and levers, each link having its members coupled adjustably by an intermediate screw, substantially as described.

5. In a friction-clutch, the combination with a member having an exterior friction-surface, of a second member having a reëntrant friction-surface in which the first-named surface is disposed, the second member having also a flange which projects radially beyond the first-named member, levers mounted upon the second member and adapted for movement to engage the flange alternately on opposite sides to move the second member into and out of engagement with the first member, a slidable collar, links connecting the collar and levers for operating the latter, and springs connected with the levers and the first-named elements to hold the levers yieldably in a predetermined position.

In testimony that I claim the foregoing as my own I have hereto affixed my signature in the presence of two witnesses.

FREDERICK LEWIS KUHN.

Witnesses:
F. A. CURRIER,
A. N. YOUNG.